(12) United States Patent
Gandhi et al.

(10) Patent No.: US 7,142,867 B1
(45) Date of Patent: Nov. 28, 2006

(54) METHOD OF DETERMINING TRANSMISSION RATE FROM A MOBILE STATION TO A BASE STATION IN A WIRELESS COMMUNICATION SYSTEM

(75) Inventors: Asif Dawoodi Gandhi, Springfield, NJ (US); Raafat Edward Kamel, Little Falls, NJ (US); Mathew Thomas, Scotch Plains, NJ (US); Stanley Vitebsky, Parsippany, NJ (US); Carl Francis Weaver, Township of Hanover, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 491 days.

(21) Appl. No.: 09/663,265

(22) Filed: Sep. 15, 2000

(51) Int. Cl.
*H04Q 7/20* (2006.01)
*H04J 3/16* (2006.01)

(52) U.S. Cl. .................... 455/453; 455/452.2; 370/468

(58) Field of Classification Search ............... 455/453, 455/452.1, 452.2, 450, 451, 509, 516, 512, 455/423–425, 67.11; 370/348, 335, 342, 370/252, 329, 441, 479, 346, 332, 333, 465, 370/468
See application file for complete search history.

(56) References Cited

U.S. PATENT DOCUMENTS

| | | | | |
|---|---|---|---|---|
| 5,161,154 A | * | 11/1992 | Diaz et al. ................... | 370/341 |
| 5,646,943 A | * | 7/1997 | Elwalid ....................... | 370/230 |
| 5,666,356 A | * | 9/1997 | Fleming et al. ............. | 370/328 |
| 5,734,646 A | * | 3/1998 | I et al. ........................ | 370/335 |
| 5,796,722 A | * | 8/1998 | Kotzin et al. ............... | 370/252 |
| 5,857,147 A | * | 1/1999 | Gardner et al. .......... | 455/67.11 |
| 5,914,950 A | * | 6/1999 | Tiedemann et al. ......... | 370/348 |
| 5,914,959 A | * | 6/1999 | Marchetto et al. .......... | 370/468 |
| 6,069,883 A | * | 5/2000 | Ejzak et al. ................. | 370/335 |
| 6,088,335 A | * | 7/2000 | I et al. ........................ | 370/252 |
| 6,195,554 B1 | * | 2/2001 | H'mimy et al. ............. | 455/450 |
| 6,216,006 B1 | * | 4/2001 | Scholefield et al. ........ | 455/450 |
| 6,219,343 B1 | * | 4/2001 | Honkasalo et al. ......... | 370/335 |
| 6,278,693 B1 | * | 8/2001 | Aldred et al. ............... | 370/252 |
| 6,459,902 B1 | * | 10/2002 | Li et al. ...................... | 455/453 |
| 6,516,196 B1 | * | 2/2003 | Chen et al. .................. | 455/450 |
| 6,519,461 B1 | * | 2/2003 | Andersson et al. ......... | 455/453 |
| 6,563,810 B1 | * | 5/2003 | Corazza ...................... | 370/335 |

(Continued)

FOREIGN PATENT DOCUMENTS

EP  0 767 548 A2  4/1997

(Continued)

OTHER PUBLICATIONS

European Search Report.

*Primary Examiner*—Charles N. Appiah

(57) ABSTRACT

A method is disclosed for determining when a request for a higher transmission rate should be granted to a mobile station that currently has access to a communication system to facilitate the maintenance of a performance target (quality of service level) of the reverse link. The method for determining when a mobile station can have access to a higher transmission rate includes obtaining first and second estimated performance indicators for a reverse link of the base station that a mobile station is currently accessing. A blocking threshold value is established. Access at the requested higher transmission rate is based on a comparison of the first and second indicators relative to the established blocking threshold value. If access is denied at the requested higher rate, access will be granted at the next lower rate which will not degrade the performance of the wireless communication system.

20 Claims, 1 Drawing Sheet

U.S. PATENT DOCUMENTS

| | | | |
|---|---|---|---|
| 6,697,375 B1 * | 2/2004 | Meng | 370/465 |
| 6,728,217 B1 * | 4/2004 | Amirijoo et al. | 370/252 |
| 6,738,350 B1 * | 5/2004 | Gao et al. | 370/232 |
| 6,944,449 B1 * | 9/2005 | Gandhi et al. | 455/425 |
| 6,963,551 B1 * | 11/2005 | Uebayashi et al. | 370/335 |

FOREIGN PATENT DOCUMENTS

| | | |
|---|---|---|
| WO | WO 98/24199 | 6/1998 |
| WO | WO 99/23842 | 5/1999 |
| WO | WO/0014900 | 3/2000 |

* cited by examiner 19.2 kbps SCH IS SUPPORTABLE:
RSSI RISE (PROJ.) < R-SCH BLOCKING THRESHOLD 2

38.4 kbps SCH IS SUPPORTABLE:
RSSI RISE (PROJ.) < R-SCH BLOCKING THRESHOLD 3

76.8 kbps SCH IS NOT SUPPORTABLE:
RSSI RISE (PROJ.) > R-SCH BLOCKING THRESHOLD 3

153.6 kbps SCH IS NOT SUPPORTABLE:
RSSI RISE (PROJ.) > R-SCH BLOCKING THRESHOLD 3

METHOD OF DETERMINING TRANSMISSION RATE FROM A MOBILE STATION TO A BASE STATION IN A WIRELESS COMMUNICATION SYSTEM

BACKGROUND OF THE INVENTION

1. Field of the Invention

This invention relates generally to mobile telephone systems and, more particularly, to a method of assigning a high data rate to a mobile station of a CDMA system.

2. Description of the Related Art

FIG. 1 illustrates a typical cellular based wireless communication system. Communications from base station 10 to mobile stations 12, 14 and 16 are transmitted using downlink channels 18, 20 and 22, respectively. Similarly, communications from mobile stations 12, 14 and 16 to base station 10 are transmitted using uplink channels 24, 26 and 28, respectively.

In a CDMA packet data system, the base station assigns channels for high data rate transmissions by the mobile stations on the reverse link. Determination of the acceptable rate is based on a number of factors such as availability of hardware resources, sufficient back haul capacity, scheduling algorithm, the ability of the air interface to support high rate transmission and the like.

A CDMA carrier is shared by multiple mobile stations involved in voice or data communication. Each mobile station transmits a spread spectrum signal on the reverse link which interferes with the signals transmitted by all other mobile stations. Data channels can have transmission rates that are significantly higher than voice or low speed data channels. As a result, transmission power and the consequent interference produced by high rate channels is higher than that produced by voice and low speed data channels. The base station tries to minimize the impact of the mutual interference between signals received from different mobile stations through the power control procedure. To keep performance of existing voice and data users at their target quality of service levels while preserving the design coverage, a need exits to complement the existing power control method with a method which can limit the adverse impact of high data rate transmissions.

SUMMARY OF THE INVENTION

In accordance with the invention, a method is disclosed for determining when a request for a higher transmission rate should be granted to a mobile station that currently has access to a communication system to facilitate the maintenance of a performance target (quality of service level) of the reverse link. The method for determining when a mobile station can have access to a higher transmission rate includes obtaining first and second estimated performance indicators for a reverse link of the base station that a mobile station is currently accessing. A blocking threshold value is established. Access at the requested higher transmission rate is based on a comparison of the first and second indicators relative to the established blocking threshold value. If access is denied at the requested higher rate, access will be granted at the next lower rate which will not degrade the performance of the wireless communication system.

BRIEF DESCRIPTION OF THE DRAWINGS

A more complete understanding of the method of the present invention can be obtained by reference to the following detailed description of the preferred embodiment that follows, taken in conjunction with the accompanying drawings, wherein.

DETAILED DESCRIPTION

Figure 1:
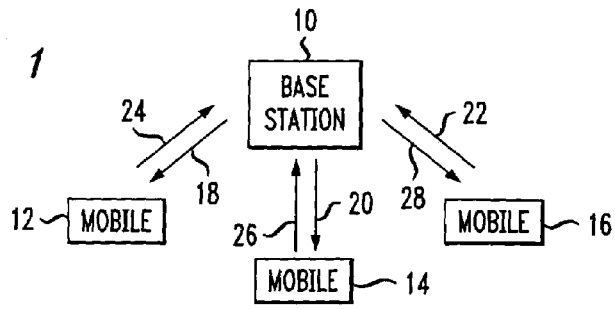
FIG. 1 illustrates a typical cellular based wireless communication system.

The invention disclosed in pending U.S. patent application Ser. No. 09/413,036, filed Oct. 6, 1999, entitled "Method and Apparatus For Controlling Reverse Link Interference Rise And Power Control Instability In A Wireless System," by Gandhi et al, discloses a method for avoiding system instability and/or overload by determining whether or not a new call should be given access to a system. In the aforementioned patent application, the cell site simultaneously estimates and maintains several parameters needed for the overload control decision. These parameters include relative interference rise over the thermal noise floor RSSI rise, loading, reverse frame error rate (RFER), and dropped call rate. Depending on implementation complexity, different subsets of these parameters are used for the control decision. The RSSI rise is measured directly at the cell site and processed appropriately via sampling and statistical averaging to reduce the impact of instantaneous variations in the received signal caused by short term effects such as voice activity, fading access probes, etc.

This parameter was shown to be a good indicator of coverage in field tests. The loading is an indicator of how much the change in interference contributed by each CDMA channel (voice, low speed or high speed data) impacts the overall system performance. The loading estimate includes contributions from mobiles in the cell of interest as well as mobiles in other cells that are coupled with the cell of interest via power control. In the call admission procedure described by the aforementioned patent application, the RSSI rise parameter is compared with the current value of a control threshold. If the threshold is exceeded, the system rejects new call arrivals to prevent further coverage and performance degradation. This threshold value is dynamically adjusted based on the current loading estimate. The rational for this approach is that the addition of new users into a highly loaded system has a stronger impact than the addition of a new user into a lightly loaded system for the same loading increment. In addition, if the system is highly loaded, the risk of triggering power control instability is greater.

In this invention, the performance of a voice and data user of a mobile station that currently has access to the system as opposed to admitting a new mobile station, is kept at a target quality of service level by using a rate assignment method. This method is based on predicting what the anticipated rise of the interference will be after a channel is assigned but prior to actually being given access at the requested new higher rate.

A high rate data burst has two major side effects on the operational status of the reverse link of a CDMA system. It increases the received CDMA power for the base stations in the vicinity and, in addition, it also increases the reverse link loading for the soft handoff base stations. The extent of these increases and the impact that they have on performance depends on the current system operational status. With this invention, an incoming reverse burst request for a data rate increase is assigned the requested rate or a new rate such that the estimated impact on the performance of the system is within the design limits of the system. With this invention, the impact of a new higher data rate burst for each of the base stations that the mobile is in soft handoff with is estimated, and the burst is admitted at a rate that will be sustainable by all of the affected base stations. The impact of the high rate burst is estimated at each cell, using the current Receive Signal Strength Indicator (RSSI) measurement and loading estimate for that sector/carrier.

The rate decision method here disclosed uses RSSI rise and loading estimates of the current operational state of the system. This method relies on relationships between the RSSI rise and loading metrics to predict the future operational state of the system if a certain rate is assigned. All possible rate assignment hypotheses are tested by comparing the projected RSSI rise with the thresholds set to enforce design coverage and quality of service for the existing calls. This test is performed at all handoff legs of the call. The rate which satisfies the admission criteria at all base stations involved in the handoff for the call becomes a possible rate for the assignment. The final rate decision is also based on additional factors such as hardware and back haul availability, scheduling considerations, etc. When the rate decision is made, it is passed to all base stations that have handoff legs for the call.

This invention is applicable to the situation where there is a delay between initial rate estimation by the handoff base stations and the final rate decision as well as between the time when the rate decision is made and when the high data rate transmission actually starts. In those instances when this delay is present, there is a possibility that the operational status of the system (RSSI rise, loading) estimated initially made may change by the time the transmission actually starts. This change may be due, for example, to the start of new data bursts or the release of existing bursts of other users that are sharing the same frequency carrier. If no appropriate measures are taken, there is a potential risk of underestimating the impact of the requested high data rate burst on existing and future users such as instability, loss of coverage, high FER and dropped calls. It is also possible that the system will overestimate the potential negative impact of the requested high data rate channel assignment, thus resulting in the granting of a rate lower than could actually be granted which will result in under utilization of the air interface resources. To prevent either of these from happening, the rate assignment procedure tracks the committed loading fraction for high data rate channels that have been assigned but are yet to start transmission as well as the loading that will be released after some of the existing transmissions end. With this invention, it is possible to obtain a more accurate estimate of what the projected operational status (RSSI rise, loading) of the system will be at the time the burst is going to start.

The loading (both current and projected) can be computed in different ways. For example, the cell may estimate loading as a fraction of reverse link voice pole capacity by assuming that a high data rate channel is equivalent to a certain number of voice channels. Another more accurate estimate involves calculating the loading based on the measurement of the reverse link signal to noise plus the interference ratio received from the mobiles on the existing reverse channels (e.g., in the CDMA 2000 system, the reverse fundamental or pilot channels); and using that information to estimate the anticipated signal to noise ratio of the requested high speed data channel from that mobile.

The expected increase in loading for a burst at rate RJ can be estimated as $$L\_\Delta_{RJ} = \gamma \times estSIR_{RJ}$$

Where $\gamma$ is dependent on the other cell interference received by other cells in this sector and can have a value of 1 or larger; and $estSIR_{RJ}$ is the estimated signal to noise ratio of the high speed data channel from this mobile.

Figure 2:
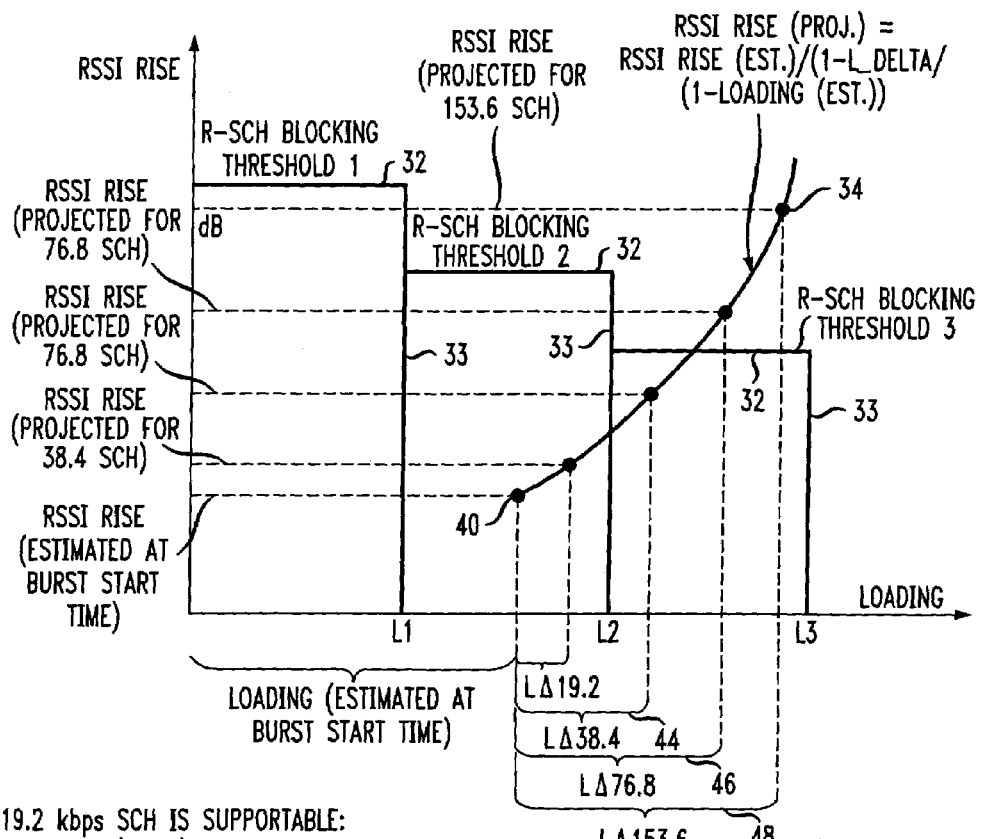
FIG. 2 illustrates a graph of receive signal strength indicator rise verses estimated loading at burst start time plus anticipated increase of loading for a burst at start time in accordance with the principles of the invention.

Referring to FIG. 2, there is illustrated a graph of receive signal strength indicator rise versus the estimated loading at burst start time plus the anticipated increase of loading for a burst at start time. FIG. 2 illustrates the method of estimating the maximum reverse data rate that is allowed for a specific user based on the current link conditions when a mobile sends a request to transmit at a new high data rate burst on the reverse link in accordance with the principles of the invention.

As illustrated in FIG. 2, the blocking threshold 32 can be based on reverse frame error rate. FIG. 2 represents an illustrative relationship between blocking threshold values and loading levels. The blocking thresholds represent overload control thresholds to prevent overloading of the wireless communications system with active mobile stations. The blocking thresholds are shown as varying versus loading in a discontinuous or step-like manner. However, the blocking thresholds may also be continuous. In FIG. 2, the vertical axis represents interference rise (i.e., RSSI rise) at a base station. The horizontal axis represents loading for a sector, a cell, or another geographic coverage region associated with the base station. The ideal RSSI-loading curve is a mathematical relationship computed from the RSSI rise and loading metrics to predict the future operational state of the system if a certain rate is assigned to a mobile station and shows how interference rise increases with greater loading. The blocking threshold is preferably decreased from a highest blocking threshold at a corresponding lowest loading level to a lowest blocking threshold at the corresponding highest loading level because the increase of a user transmission rate at a lower loading level results in a smaller increase in the interference rise than at a high loading level. Therefore, the impact of performance of the existing mobile stations is less for lower loading levels.

As illustrated in FIG. 2, the blocking threshold 32 is decreased in three steps from a lowest loading range in a first region, to an intermediate loading range in a second region, to a highest loading range in a third region. It is to be understood that the blocking threshold 32 can be a linear function or a continuous curve. In FIG. 2 the blocking threshold is illustrated as a step function having three separate regions where the first, second and third regions are each separated by a solid vertical line.

A base station or another network element can estimate loading on the wireless communications system in accordance with various alternative techniques. Once the loading level is estimated, the nominal blocking threshold can be determined from a look up table based on, for example, FIG. 2.

When a request is made by a mobile for permission to transmit at a new higher rate burst, the base station estimates what the value of the current receive signal strength indicator rise will be at the burst start time, and also estimates what the value of the loading will be at the burst start time. Each value, the RSSI rise value and the loading value is for all active voice and data connections and these two values are used to determine point 40 of curve 42 of FIG. 2.

The base station determines the anticipated change in loading that will occur if a new high rate channel is assigned. To do this, the base station determines the sum of the current loading and the change of loading (LΔ) for each possible rate. This is illustrated in FIG. 2 as a shift to the right along the abscissa axis by an amount that corresponds to different values of LΔ and is indicated by reference numerals 42 for channel rate of 19.2 Kbps; 44 for channel rate of 38.4 Kbps; 46 for channel rate of 76.8 Kbps; and 48 for channel rate of 153.6 Kbps.

Next, the base station determines what the projected receive signal strength indicator rise will be if the requested high rate channel is assigned and actually used. The projected receive signal strength indicator (RSSI Projected) Rise is determined from the following relationship:

$$\text{RSSI Rise (projected)} = \frac{\text{RSSI Rise (estimated)}}{1 - \frac{L\Delta_{RJ}}{1 - L(\text{estimated})}}$$

Where RSSI Rise (estimated) (curve 34) is the estimated receive signal strength indicator at the burst start time;

$L\Delta_{RJ}$ is the projected change of loading for the mobile requesting the new channel; and L (estimated) is the loading estimated at the burst start time.

The projected RSSI rise and the loading (the sum of the loading at burst start time plus the change in loading (LΔ) for the requested high rate channel) predict what the anticipated state of the system will be after the high rate channel is assigned and used.

The base station then compares the value of the projected RSSI rise with the threshold value. If the projected RSSI rise is less than the threshold value, the base station will allow the request for the high rate burst. If, however, the projected RSSI rise is greater than the threshold value (curve 32), then the base station will deny the request. It is to be noted that the threshold values are chosen from the region which corresponds to the anticipated loading after the requested channel for the high rate burst has been added. Thus, the projected increase in loading is taken in conjunction with the expected loading at the burst start time (using current loading and loading information about other bursts that will be active at that time) to estimate the increase in RSSI rise from allocating this burst. If the RSSI rise increase is above the design limit for that projected loading, the burst allocation at that rate is denied. If the burst allocation at the requested rate is denied, the next lower rate allocation hypothesis is considered, and the process continues until a choice for the burst rate that satisfies the loading and the RSSI rise design constraints is obtained and it is this new rate that will be assigned.

Although a preferred embodiment of the method of the present invention has been illustrated in the accompanying drawings and described in the foregoing detailed description, it is to be understood that the invention is not limited to the embodiment disclosed, but is capable of numerous rearrangements, modifications and substitutions without departing from the spirit and scope of the invention as set forth and defined by the following claims.

The invention claimed is:

1. A method for determining when a request for higher transmission rate should be granted to a mobile station that has access to a communication system comprising the steps of:

calculating a first indicator using a second indicator, for all active connections;

deciding whether to grant the mobile station access to use the requested higher transmission rate based on a comparison of at least one of the first indicator and the second indicator relative to at least one blocking threshold;

tracking at least one of the indicators, if the mobile station is granted access to use the requested higher transmission rate, prior to transmissions by the mobile station at the higher transmission rate; and deciding whether to deny the mobile station access to use the requested higher transmission rate based on a comparison of the at least one tracked indicator to the at least one blocking threshold.

2. The method of claim 1 wherein the first and second indicators contain current loading and interference values.

3. The method of claim 2 wherein the first and second indicators also contain changes in loading and interference values due to connections being dropped or added prior to burst start time.

4. The method of claim 1 further comprising:

denying access at the requested higher transmission rate to the mobile station when the first indicator exceeds the blocking threshold value to avoid degradation of performance of the wireless communication system.

5. The method of claim 3 further comprising:

granting the mobile station access to use a transmission rate that is lower than the requested rate when access at the requested rate is denied.

6. The method of claim 1 wherein the mobile station is granted access to use the requested higher transmission rate when the first indicator is less than or equal to the blocking threshold.

7. The method of claim 1 further comprising:

establishing a threshold defined by a maximum blocking threshold wherein the maximum blocking threshold is set at a value which will prevent overloading of the communication system.

8. The method of claim 7 wherein the maximum blocking threshold is constant for different estimate loading values.

9. The method of claim 7 wherein the maximum blocking threshold decreases as the loading increases.

10. The method of claim 7 wherein the maximum blocking threshold decreases in steps as the loading increases.

11. The method of claim 7 wherein the maximum blocking threshold decreases uniformly as the loading increases.

12. A method for determining when a request for higher transmission rate should be granted to a mobile station that has access to a communication system comprising:

obtaining a fit estimated performance indicator and a second estimated performance indicator for all active connections;

establishing a blocking threshold; and deciding whether to grant or deny the mobile station access to use the requested higher transmission rate based on a comparison of the first and second indicators relative to the established blocking threshold, wherein the deciding step comprises denying access at the requested higher transmission rate to the mobile station when the first performance indicator exceeds the blocking threshold value to avoid degradation of performance of the wireless communication system, wherein the obtaining step comprises obtaining a projected receive signal strength indicator rise as the first estimated performance indicator and estimated loading as the second indicator, the projected receive signal strength indicator rise being a ratio of the estimated receive signal strength indicator at the start time to one minus the projected change of loading for the mobile station requesting the new channel divided by one minus the estimated loading.

13. The method of claim 12 wherein the obtaining step further comprises obtaining the projected receive signal strength indicator rise and the estimated loading, each for all active 3 connections.

14. The method of claim 12 wherein the estimated loading is the sum of the current loading contributions from each connection which is used to obtain a value of the first indicator.

15. The method of claim 14 wherein the projected loading is the sum of the estimated loading and the change of loading for each possible higher rate which is used to obtain a discrete value of the first indicator for each loading.

16. The method of claim 14 wherein the deciding step grants the mobile station access to the highest possible rate which provides a first indicator value that is below the blocking threshold.

17. A method of communicating with a mobile station over a network cannel, the method comprising the steps of:
 determining whether to grant the mobile station access to a transmission rate higher than a current transmission rate of the mobile station, based on a comparison of at least one channel indicator to at least one blocking threshold;
 trading the at least one channel indicator, if the mobile station is granted access to the higher transmission rate, prior to transmissions by the mobile station at the higher transmission rate; and
 determining whether to deny the mobile station access to the higher transmission rate based on a comparison of the at least one tracked channel indicator to the at least one blocking threshold.

18. The method of claim 17 wherein the at least one channel indicator comprises at least one estimated performance indicator of the network channel for all active connections on the channel, said performance indicator incorporating an estimated channel load including the higher transmission rate.

19. The method of claim 18 further comprising:
 granting access at an intermediate transmission rate to a mobile station denied access to the higher transmission rate, said intermediate transmission rate being between the higher transmission rate and the current transmission rate, wherein the intermediate rate is the highest transmission rate to satisfy a desired quality level of the channel relative to the at least one blocking threshold.

20. The method of claim 18 further comprising:
 granting access at an elevated transmission rate to a mobile station granted access to the higher transmission rate, based on a comparison of the at least one tracked channel indicator to the at least one blocking threshold, wherein the elevated transmission rate is greater than the higher transmission rate and satisfies a desired quality level of the channel relative to the at least one blocking threshold.

* * * * *